(12) United States Patent
Yu et al.

(10) Patent No.: US 9,680,394 B2
(45) Date of Patent: Jun. 13, 2017

(54) ENERGY VOLTAGE REGULATOR AND CONTROL METHOD APPLICABLE THERETO

(71) Applicant: INDUSTRIAL TECHNOLOGY RESEARCH INSTITUTE, Hsinchu (TW)

(72) Inventors: Ming-Hung Yu, Miaoli (TW); Po-Li Chen, Erlin Township, Changhua County (TW)

(73) Assignee: Industrial Technology Research Institute, Chutung, Hsinchu (TW)

( * ) Notice: Subject to any disclaimer, the term of this patent is extended or adjusted under 35 U.S.C. 154(b) by 85 days.

(21) Appl. No.: 14/476,207

(22) Filed: Sep. 3, 2014

(65) Prior Publication Data

US 2015/0288295 A1 Oct. 8, 2015

(30) Foreign Application Priority Data

Apr. 3, 2014 (TW) .............................. 103112475 A

(51) Int. Cl.
*H02M 7/219* (2006.01)
*H02M 7/537* (2006.01)
(Continued)

(52) U.S. Cl.
CPC ............. *H02M 7/219* (2013.01); *H02J 3/383* (2013.01); *H02M 1/42* (2013.01); *H02M 7/537* (2013.01); *Y02B 70/12* (2013.01); *Y02E 10/563* (2013.01)

(58) Field of Classification Search
CPC ...... H02M 1/38; H02M 1/12; H02M 7/53873; H02M 2001/0009; H02M 7/537;
(Continued)

(56) References Cited

U.S. PATENT DOCUMENTS 6,043,633 A * 3/2000 Lev ..................... H02M 1/4225
323/222
7,336,255 B2 2/2008 Nguyen et al.
(Continued)

FOREIGN PATENT DOCUMENTS

CN 103001526 3/2013
JP 9-131069 A 5/1997
(Continued)

OTHER PUBLICATIONS

Hu, et al., "Efficiency Improvement of Grid-Tied Inverters at Low Input Power Using Pulse-Skipping Control Strategy", IEEE Transactions on Power Electronics, Dec. 2010, pp. 3129-3138, vol. 25, No. 12.

(Continued)

*Primary Examiner* — Fred E Finch, III
*Assistant Examiner* — Demetries A Gibson
(74) *Attorney, Agent, or Firm* — Muncy, Geissler, Olds & Lowe, P.C.

(57) ABSTRACT

A control method for an energy voltage regulator includes: detecting an output AC signal of a current cycle to generate a reference current command; comparing the reference current command with a reference upper power limit; and if the reference current command is lower than the reference upper power limit, generating a first current command based on the reference current command, to perform a discontinuous conduct control and to operate the energy voltage regulator under a discontinuous conduct state.

10 Claims, 3 Drawing Sheets

(51) Int. Cl.
*H02M 1/42* (2007.01)
*H02J 3/38* (2006.01)

(58) Field of Classification Search
CPC .......... H02M 1/42; H02M 7/219; H02J 3/383;
Y02B 70/12; Y02E 10/563
USPC .... 323/266, 277, 312, 357, 358; 363/15, 17,
363/21.01, 21.09, 21.17, 21.18, 109
See application file for complete search history.

(56) References Cited

U.S. PATENT DOCUMENTS

| | | | |
|---|---|---|---|
| 8,339,813 B2 | 12/2012 | Wang et al. | |
| 2005/0036337 A1* | 2/2005 | Zhang | H02M 3/1584 363/17 |
| 2009/0079383 A1 | 3/2009 | Fornage et al. | |
| 2009/0140706 A1* | 6/2009 | Taufik | H02M 3/1584 323/272 |
| 2011/0088748 A1 | 4/2011 | Lee | |
| 2011/0292701 A1 | 12/2011 | Fornage | |
| 2012/0014148 A1* | 1/2012 | Li | H02M 1/4216 363/78 |
| 2012/0290145 A1* | 11/2012 | Joshi | H02J 3/385 700/298 |
| 2013/0027990 A1* | 1/2013 | Baurle | H02M 3/33507 363/21.17 |
| 2013/0094268 A1 | 4/2013 | Chapman et al. | |
| 2013/0241506 A1* | 9/2013 | Yang | G05F 1/62 323/282 |

FOREIGN PATENT DOCUMENTS

| | | |
|---|---|---|
| JP | 2004-208491 A | 7/2004 |
| JP | 2005-354766 A | 12/2005 |
| JP | 2009-27806 A | 2/2009 |
| JP | 2009-219311 A | 9/2009 |
| JP | 2010-226919 A | 10/2010 |
| TW | 2008-1211 A | 3/2008 |
| TW | I424658 | 1/2014 |

OTHER PUBLICATIONS

Feng et al., "Optimal Trajectory Control of Burst Mode for LLC Resonant Converter", IEEE Transactions on Power Electronics, Jan. 2013, pp. 457-466, vol. 28, No. 1.
Zhao et al., "Utility Grid Impact with High Penetration PV Micro-Inverters Operating under Burst Mode Using Simplified Simulation Model", IEEE, 2011, pp. 3928-3932.
Chen et al., "Single DC/AC CCFL Inverter for Large Size LCD TV with Burst Control", IEEE, 2006, pp. 844-847.
Lee et al., "Improvement of power-conversion efficiency at light-load using a variable-duty burst mode", IEEE, 2013, pp. 142-146.
TW Office Action from TW Appl No. 10420678150 dated May 25, 2015, 4 pp.

* cited by examiner

US 9,680,394 B2

ENERGY VOLTAGE REGULATOR AND CONTROL METHOD APPLICABLE THERETO

CROSS-REFERENCE OF RELATED APPLICATION

This application claims the benefit of Taiwan application Serial No. 103112475, filed Apr. 3, 2014, the subject matter of which is incorporated herein by reference.

TECHNICAL FIELD

The disclosure relates in general to an energy voltage regulator and a control method applicable thereto.

BACKGROUND

Human civilization is established on adequate supply of energy. Once energy supply turns inadequate, the lifestyle and development of modern society will be severely affected. However, the storage capacities of energy sources such as petroleum and natural gas are limited, and energy shortage may trigger energy crisis. Therefore, more and more people are engaged in the development of clean energy with an aim to resolving or mitigating energy crisis. Solar energy is one of the clean energies.

During the generation of solar power, the solar panel converts solar energy into a DC power. After DC-to-DC conversion and DC-to-AC conversion is performed on the DC power outputted by the solar panel, a filter is used to filter high frequency signals off to obtain an AC power. The AC power may then be used by clients or sold to electricity suppliers.

The generation of solar power is closely related to the intensity of sunshine but the intensity of sunshine keeps changing all the time. However, during the operation of solar energy conversion system, operations of the control circuit and switch of the switching element are power consuming. Therefore, how to reduce the power consumption of the solar power regulator is very critical.

SUMMARY

The disclosure is directed to an energy voltage regulator and a control method applicable thereto capable of performing discontinuous conduction control to maintain high-efficiency performance even when the energy voltage regulator is in light-loading and to remove harmonic components off the AC current.

According to one embodiment of the present disclosure, a control method for an energy voltage regulator is disclosed. The method includes: detecting an AC output signal within a current cycle to generate a reference current command; comparing the reference current command with a reference upper power limit; generating a first current command according to the reference current command to perform discontinuous conduction control and to operate the energy voltage regulator under a discontinuous conduction state if the reference current command is lower than the reference upper power limit According to another embodiment of the present disclosure, an energy voltage regulator comprising a switch circuit, a switch controller, a current command generator, and discontinuous conduction controller is disclosed. The switch controller is coupled to the switch circuit for controlling the switch circuit. The current command generator is coupled to the switch controller for detecting an AC output signal within a current cycle to generate a reference current command and comparing the reference current command with a reference upper power limit. The discontinuous conduction controller is coupled to the switch controller and the current command generator. If the current command generator determines that the reference current command is lower than the reference upper power limit, then the current command generator informs the discontinuous conduction controller to generate a first current command to the switch controller according to the reference current command. The switch controller controls the switch circuit to perform discontinuous conduction control and thus the energy voltage regulator is operated under a discontinuous conduction state.

The above and other aspects of the disclosure will become better understood with regard to the following detailed description of the preferred but non-limiting embodiment (s). The following description is made with reference to the accompanying drawings.

Figure 1:
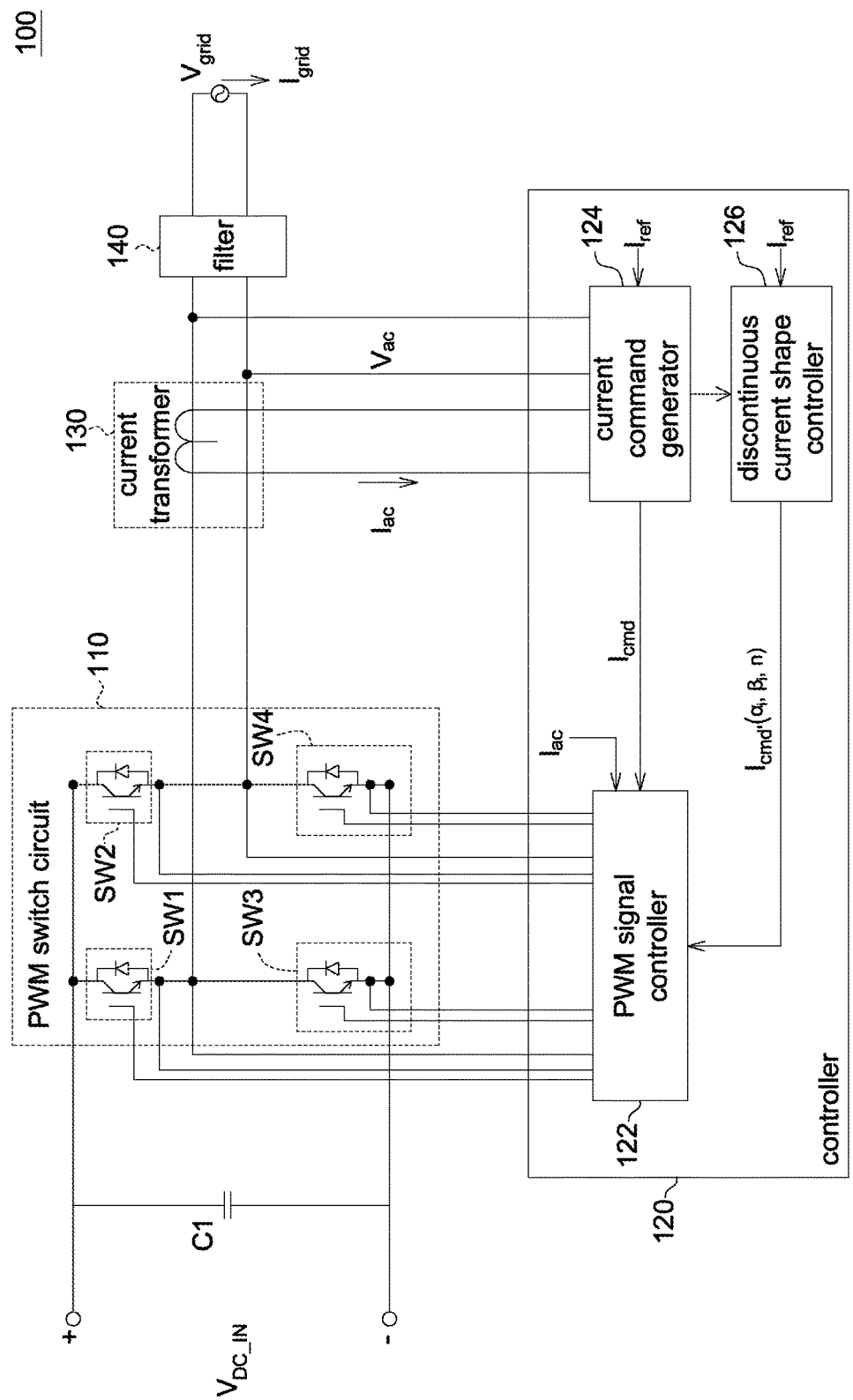
FIG. 1 is a circuit diagram of a solar power regulator according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION OF THE DISCLOSURE

Each of the disclosed embodiments has one or more technical features. In possible implementation, one skilled person in the art would selectively implement part or all technical features of any embodiment of the disclosure or selectively combine part or all technical features of the embodiments of the disclosure.

Referring to FIG. 1, a circuit diagram of a solar power regulator according to an embodiment of the disclosure is shown. As indicated in FIG. 1, the solar power regulator 100 includes a capacitor C1, a pulse width modulation (PWM) switch circuit 110, a controller 120, a current transformer 130 and a filter 140. The PWM switch circuit 110 includes a plurality of switches. In the present embodiment, the PWM switch circuit 110 includes switches SW1~SW4 for description purpose, but the disclosure is not limited thereto.

The controller 120 includes a PWM signal controller 122, a current command generator 124 and a discontinuous current shape controller 126.

Figure 2:
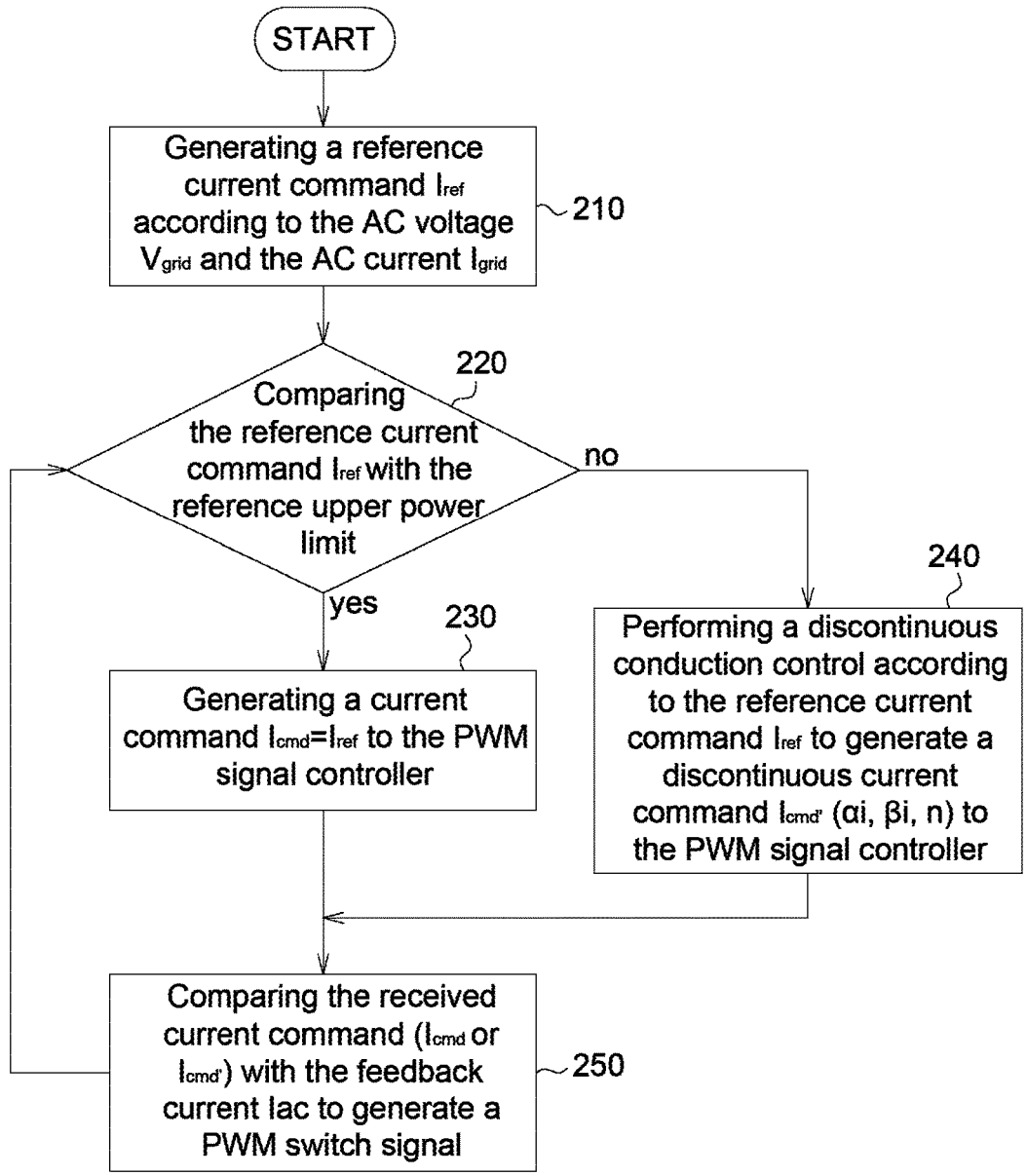
FIG. 2 is a flowchart of a control method for a solar power regulator according to an embodiment of the disclosure.
Figure 3:
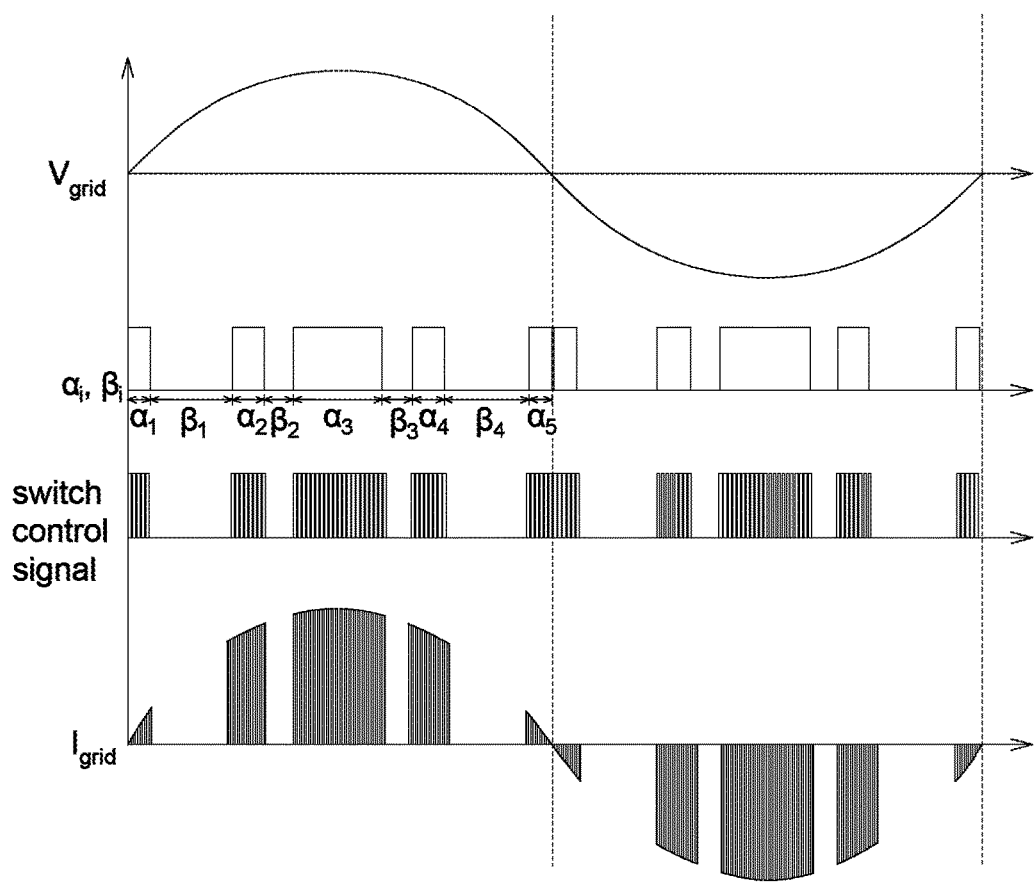
FIG. 3 is a signal waveform diagram of a solar power regulator according to an embodiment of the disclosure.

FIG. 2 is a flowchart of a control method for the solar power regulator according to the embodiment of the disclosure. FIG. 3 is a signal waveform diagram of the solar power regulator according to the embodiment of the disclosure. Refer to FIG. 1~FIG. 3.

The DC power $V_{DC\_IN}$ outputted from the solar panel (also referred as the DC power source) may be stored in the capacitor C1. The capacitor C1 is coupled to the PWM switch circuit 110. The PWM switch circuit 110 is controlled by the PWM signal controller 122 of the controller 120, to convert the DC power stored in the capacitor C1 into AC power.

The PWM signal controller 122 receives a current command $I_{cmd}$ generated by the current command generator 124 and a discontinuous current command $I_{cmd'}$ generated by the discontinuous current shape controller 126. Basically, at any time, the PWM signal controller 122 receives one of the current command $I_{cmd}$ generated by the current command generator 124 and the discontinuous current command $I_{cmd'}$ generated by the discontinuous current shape controller 126. That is, the PWM signal controller 122 does not receive both of the current command $I_{cmd}$ generated by the current command generator 124 and the discontinuous current command $I_{cmd'}$ generated by the discontinuous current shape controller 126 at the same time.

According to the feedback current signal $I_{ac}$ and the received current command ($I_{cmd}$ or $I_{cmd'}$), the PWM signal controller 122 generates a PWM switch signal to the PWM switch circuit 110 to control switching of the switches SW1~SW4 of the PWM switch circuit 110 to generate an AC output. The AC output generated by the PWM switch circuit 110 is filtered by the filter 140 into an AC voltage $V_{grid}$ and an AC current $I_{grid}$. The AC voltage $V_{grid}$ and the AC current $I_{grid}$ may be used by clients (such as households or office buildings) or sold to electricity suppliers.

As indicated in step 210 of FIG. 2, a reference current command $I_{ref}$ is generated according to the AC voltage $V_{grid}$ and the AC current $I_{grid}$. That is, the current command generator 124 generates the reference current command $I_{ref}$ according to the current signal $I_{ac}$ and the voltage signal $V_{ac}$, wherein, there is a relationship between the current signal $I_{ac}$ and the AC current $I_{grid}$. For example, the current signal $I_{ac}$ is obtained by reducing the AC current $I_{grid}$, and the voltage signal $V_{ac}$ is obtained by reducing the AC current $V_{grid}$.

If the large-amplitude AC current from the PWM switch circuit 110 is directly inputted to the current command generator 124, the AC current may damage the current command generator 124. In an embodiment of the present disclosure, the current transformer 130 reduces the large-amplitude AC current from the PWM switch circuit 110 as the current signal $I_{ac}$, which is then inputted to the current command generator 124.

That is, in step 210, after the current command generator 124 detects the current signal $I_{ac}$ and the voltage signal $V_{ac}$ of the current cycle, the current command generator 124 compares the AC voltage $V_{grid}$ and the AC current $I_{grid}$ of a previous cycle with the AC voltage $V_{grid}$ and the AC current $I_{grid}$ of the current cycle by an algorithm (such as the maximum power point tracker (MPPT) algorithm) to generate the reference current command $I_{ref}$. In some possible embodiments, the reference current command $I_{ref}$ may represent a percentage of the AC current $I_{grid}$. Or, in some possible implementations, the reference current command $I_{ref}$ may represent "percentage".

In step 220, after the reference current command $I_{ref}$ is generated, the current command generator 124 compares the reference current command $I_{ref}$ with the reference upper power limit. For example, the current command generator 124 compares whether the reference current command $I_{ref}$ is higher than a half of the (full-load) AC current. That is, in the case, the reference upper power limit is a half of the full-load AC current. If the judgment in step 220 is positive, then the method proceeds to step 230; and if the judgment in step 220 is negative, then the method proceeds to step 240.

In step 230, the current command generator 124 generates the current command $I_{cmd}=I_{ref}$ to the PWM signal controller 122.

In step 240, the discontinuous current shape controller 126 performs discontinuous conduction control according to the reference current command $I_{ref}$ to generate the discontinuous current command $I_{cmd'}$ ($\alpha_i$, $\beta_i$, n) to the PWM signal controller 122.

If the current command generator 124 determines that the reference current command $I_{ref}$ is higher than a half of the full-load AC current $I_{grid}$, (i.e. yes in step 220, which implies that the current power output is sufficient and thus the discontinuous conduction control is not needed), the current command generator 124 generates the current command $I_{cmd}=I_{ref}$ to the PWM signal controller 122. If the current command generator 124 determines that the reference current command $I_{ref}$ is not higher than a half of the full-load AC current $I_{grid}$, (i.e. no in step 220, which implies that the current power output is not sufficient, and thus the discontinuous conduction control is needed), the current command generator 124 informs the discontinuous current shape controller 126 to perform discontinuous conduction control according to the reference current command $I_{ref}$ to generate the discontinuous current command $I_{cmd'}$ ($\alpha_i$, $\beta_i$, n) to the PWM signal controller 122. Moreover, in the same cycle, only one of the current command generator 124 and the discontinuous current shape controller 126 is allowed to generate the current command to the PWM signal controller 122.

In step 250, the PWM signal controller 122 compares the received current command ($I_{cmd}$ or $I_{cmd'}$) with the feedback current $I_{ac}$ to generate a PWM switch signal to control the switching of the switches SW1~SW4 of the PWM switch circuit 110. The generation of the PWM switch signal by the PWM signal controller 122 is not specified. In an embodiment of the disclosure, if the PWM signal controller 122 receives the current command $I_{cmd}=I_{ref}$, the PWM switch is under a continuous conduction state. Conversely, if the PWM signal controller receives the current command $I_{cmd'}$, the PWM switch is under a discontinuous conduction state.

Details of the discontinuous conduction control in the embodiment of the present disclosure are disclosed below.

In the embodiment of the disclosure, the command generator 124 detects the current output current $I_{ac}$ and the current output voltage $V_{ac}$ of the PWM switch circuit to determine the current power output of the solar power regulator 100. The current command generator 124 compares the current power output with the reference upper power limit to determine whether the solar power regulator 100 needs to perform discontinuous conduction control.

If the current power output is lower than the reference upper power limit, then discontinuous conduction control is performed. Under the discontinuous conduction control, the discontinuous current shape controller 126 informs the PWM signal controller 122 to control a pulse width value (during which PWM switches is conducted), such that the solar power regulator outputs the output current $I_{grid}$ synchronizing with the AC voltage $V_{grid}$.

As indicated in FIG. 3, the discontinuous current shape controller 126 outputs parameters $\alpha_i$, $\beta_i$ and n (i and n are positive integers, $1 \le i \le n$), wherein, the parameter "$\alpha_i$" represents a width of an action period of the PWM switch circuit, parameter "$\beta_i$" represents a width of a non-action period of the PWM switch circuit, and the parameter "n" represents a number of conduction times within a half cycle of the AC output voltage (or, number of action periods within a half cycle). As indicated in FIG. 3, n=5.

That is, during the action period $\alpha_i$, the PWM signal controller 122 controls the switching of the switches SW1~SW4 of the PWM switch circuit 110. Conversely, during the non-action period $\beta_i$, the PWM signal controller 122 completely turns off the switches SW1~SW4 of the PWM switch circuit 110. Besides, both the parameters $\alpha_i$ and $\beta_i$ are smaller than a half cycle of the AC output voltage $V_{grid}$, wherein $0 \leq \alpha_i \leq 180°$; and $0 \leq \beta_i \leq 180°$.

That is, the action period $\alpha_i$ is an action period of the solar power regulator, and the non-action period $\beta_i$ is a non-action period of the solar power regulator. That is, during the non-action period $\beta_i$, the solar power regulator 100 stores the DC power $V_{DC\_IN}$ outputted from the solar panel in the capacitor C1. During the action period $\alpha_i$, the solar power regulator 100 converts the electric energy temporarily stored in the capacitor C1 into the AC output voltage $V_{grid}$ and the AC output current $I_{grid}$.

A power output almost equivalent to the default power output may be obtained by adjusting the number of conduction times n, the action period $\alpha_i$ and the non-action period $\beta_i$.

Also, during each action period $\alpha_i$, the switches are switched at least once (that is, each action period $\alpha_i$ includes at least one switching pulse), so that the switches SW1~SW4 convert the DC power $V_{DC\_IN}$ outputted from the solar panel into the AC power output. The AC power output has a current waveform of discontinuous conduction type. The output voltage and the output current from the PWM switch circuit 110 are in the same phase and synchronous with the AC voltage $V_{grid}$ and the AC current $I_{grid}$.

Details of the adjustments of the action period $\alpha_i$, the non-action period $\beta_i$ and the number of conduction times n are disclosed below.

The number of conduction times n is adjusted such that within a half cycle, the summation of the power output of the solar power regulator during the action periods $\alpha_1 \sim \alpha_n$ is equivalent to the default power output. Suppose the default power output is 10 W. The discontinuous current shape controller 126 outputs the three action periods $\alpha_1$, $\alpha_2$ and $\alpha_3$ and the summation of power output of the solar power regulator during the three action periods $\alpha_1$, $\alpha_2$ and $\alpha_3$ is equivalent to 10 W. That is, if necessary, the number of conduction times n may be increased, such that the solar power regulator may output higher power during more action periods within a half cycle.

Or, the time width of the action period $\alpha_i$ is adjusted such that the solar power regulator may generate the default power output within a half cycle. For example, if the default power output is increased by four times, then the width of the action period $\alpha_i$ must also be increased by four times such that the power output is increased to match the default power output.

Or, the duty cycle and/or the switching frequency of the switches SW1~SW4 during the action period $\alpha_i$ is adjusted, such that the power output of the solar power regulator matches the default power output. For example, if the default power output is increased, then the duty cycle and/or the switching frequency of the switches SW1~SW4 may be correspondingly increased during the action period $\alpha_i$.

If the current power output is over the reference upper power limit, then the solar power regulator does not have to perform discontinuous conduction control. In other words, under such circumstance, the PWM signal controller 122 controls the switches SW1~SW4 of the PWM switch circuit 110 to output currents and voltages to the rear end.

In the embodiment of the disclosure, under a discontinuous conduction state, when outputting the parameters $\alpha_i$, $\beta_i$ and n, the discontinuous current shape controller 126 may adjust the parameters according to the default power output so as to optimize the conversion efficiency and power output quality of the solar power regulator.

In another embodiment of the disclosure, in order to optimize the conversion efficiency, the longest action period $\alpha_i$ may correspond to the peak of the power output $V_{grid}$. As indicated in FIG. 3, the action period $\alpha_3$, being the longest action period of the action periods $\alpha_1 \sim \alpha_5$ covers the peak of the power output $V_{grid}$, and remaining parameters $\alpha_i$ and $\beta_i$ may be symmetrically or asymmetrically arranged at two sides of the longest action period $\alpha_3$. To increase the conversion efficiency, no action period is at the zero-crossing point of the output voltage $V_{grid}$. As indicated in FIG. 3, in order to increase the conversion efficiency, the action period $\alpha_5$, which originally covers the zero-crossing point of the output voltage $V_{grid}$, is cancelled.

In the embodiment of the disclosure, under the circumstance that the power output of the solar panel does not reach the reference upper power limit (that is, the power output of the solar panel is not satisfactory), the solar power regulator operates under a discontinuous conduction control mode. Thus, the solar power regulator is not in action over the entire cycle, and the conduction periods and conduction times of the switches of the PWM switch circuit are adjusted through the adjustment in the parameters $\alpha_i$, $\beta_i$ and n. Within a duty cycle of the AC power output, the number of switching times of the switches of the PWM switch circuit of the embodiment of the present disclosure is lesser than that of the generally known technology, such that switching losses are effectively reduced and the conversion efficiency may thus be significantly increased.

In an embodiment of the disclosure, to reduce the impact caused by the harmonic waves of the discontinuous conduction mode, through the adjustment in the parameter $\alpha_i$, harmonic components of the output current are eliminated to increase the power factor of the output current, such that the solar power regulator 100 will operate under better optimization conditions to achieve higher quality of power output.

Although the above embodiments are exemplified by a solar panel, the present disclosure is not limited thereto. Other embodiments of the present disclosure may also be used in an energy conversion device such as a wind power unit.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A control method for an energy voltage regulator, comprising:

detecting an AC output signal within a current cycle to generate a reference current command signal;

comparing the reference current command signal with a reference upper current signal; and generating a first current command signal according to the reference current command signal to perform discontinuous conduction control and to operate the energy voltage regulator under a discontinuous conduction state if the reference current command signal is lower than the reference upper current signal;

wherein a width of an action period, a number of the action periods within a half cycle and a width of a non-action period of the energy voltage regulator are determined based on comparison of the reference current command signal and the reference upper current signal;

a second current command signal is generated according to the reference current command signal to perform continuous conduction control and to operate the energy voltage regulator under a continuous conduction state if the reference current command signal is higher than the reference upper current signal;

the second current command signal includes an action period parameter, a non-action period parameter and a number of conduction times parameter;

the action period parameter represents the width of the action period of a plurality of internal switches of the energy voltage regulator;

the non-action period parameter represents the width of the non-action period of the internal switches of the energy voltage regulator; and the number of conduction times parameter represents a number of conduction times within a half cycle of the AC output signal.

2. The control method according to claim 1, further comprising:

comparing the first or the second current command signal with a feedback current signal to obtain a switching signal, which controls switching of the plurality of internal switches of the energy voltage regulator;

wherein, the feedback current signal is related to the AC output signal detected within the current cycle.

3. The control method according to claim 1, further comprising:

detecting a converted AC output current and a converted AC output voltage within the current cycle to generate the reference current command signal.

4. The control method according to claim 1, wherein:

the reference upper current signal is related to a full-load AC output current.

5. The control method according to claim 1, wherein:

the internal switches are switched at least once within the width of the action period; and the internal switches are not switched at all within the width of the non-action period.

6. An energy voltage regulator, comprising:

a switch circuit;

a switch controller coupled to the switch circuit for controlling the switch circuit;

a current command generator coupled to the switch controller for detecting an AC output signal within a current cycle to generate a reference current command signal and comparing the reference current command with a reference upper current signal; and a discontinuous conduction controller coupled to the switch controller and the current command generator;

wherein if the current command generator determines that the reference current command signal is lower than the reference upper current signal, then the current command generator informs the discontinuous conduction controller to generate a first current command signal to the switch controller according to the reference current command signal, the switch controller controls the switch circuit to perform discontinuous conduction control and thus the energy voltage regulator is operated under a discontinuous conduction state;

wherein a width of an action period, a number of the action periods within a half cycle and a width of a non-action period of the energy voltage regulator are determined based on comparison of the reference current command signal and the reference upper current signal;

if the current command generator determines that the reference current command signal is higher than the reference upper current signal, then the current command generator generates a second current command signal to the switch controller according to the reference current command signal, the switch controller controls the switch circuit to perform continuous conduction control and thus the energy voltage regulator is operated under a continuous conduction state;

the second current command signal generated by the discontinuous conduction controller includes an action period parameter, a non-action period parameter and a number of conduction times parameter;

the action period parameter represents the width of the action period of a plurality of internal switches of the energy voltage regulator;

the non-action period parameter represents the width of the non-action period of the internal switches of the energy voltage regulator; and the number of conduction times parameter represents a number of conduction times within a half cycle of the AC output signal.

7. The energy voltage regulator according to claim 6, wherein:

the switch controller compares the first or the second current command signal with a feedback current signal to obtain a switching signal, which controls switching of the plurality of internal switches of the switch circuit of the energy voltage regulator;

wherein, the feedback current signal is related to the AC output signal detected within the current cycle.

8. The energy voltage regulator according to claim 6, wherein:

the current command generator detects a converted AC output current and a converted AC output voltage within the current cycle to generate the reference current command signal.

9. The energy voltage regulator according to claim 6, wherein:

the reference upper current signal is related to a full-load AC output current.

10. The energy voltage regulator according to claim 6, wherein:

the switch controller controls the internal switches of the switch circuit to switch at least once within the width of the action period according to the first current command signal; and the switch controller controls the internal switches of the switch circuit not to switch at all within the width of the non-action period according to the first current command signal.

* * * * *